(12) United States Patent
Phung et al.

(10) Patent No.: US 7,352,947 B2
(45) Date of Patent: Apr. 1, 2008

(54) CABLE MANAGEMENT SUPPORT SYSTEM

(75) Inventors: Phillip Phung, Kirkland, WA (US);
Frank Chin-Hwan Kim, Woodinville, WA (US); Patrick S. McNutt, Carnation, WA (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 0 days.

(21) Appl. No.: 11/361,702

(22) Filed: Feb. 23, 2006

(65) Prior Publication Data

US 2007/0104450 A1    May 10, 2007

Related U.S. Application Data

(60) Provisional application No. 60/734,047, filed on Nov. 4, 2005.

(51) Int. Cl.
*G02B 6/00* (2006.01)

(52) U.S. Cl. ............... 385/135; 385/134; 385/136; 248/68.1; 248/49; 248/65

(58) Field of Classification Search ........ 385/134–136; 248/68.1, 49, 65; 174/484
See application file for complete search history.

(56) References Cited

U.S. PATENT DOCUMENTS 6,129,316 A * 10/2000 Bauer ................ 248/68.1

* cited by examiner

*Primary Examiner*—Brian Healy
*Assistant Examiner*—Guy G Anderson
(74) *Attorney, Agent, or Firm*—Brian L. Johnson; George C. Rondeau, Jr.; Davis Wright Tremaine LLP

(57) ABSTRACT

A cable management support for a conventional equipment rack provides various bars and members to support, order, direct and otherwise manage cables coupled to equipment secured in the rack.

33 Claims, 16 Drawing Sheets

CABLE MANAGEMENT SUPPORT SYSTEM

FIELD OF THE INVENTION

Generally, the present invention relates to cable management devices for communication equipment racks.

BACKGROUND OF THE INVENTION

Communication cables such as fiber optic and metal cables tend to be plentiful and a challenge in managing the cables to keep them orderly and supported at junction points involving communication racks. Communication racks are used for many sorts of applications including telephony, networking, and other communication related applications. Unfortunately, conventional solutions to cable management challenges can present challenges of their own such as with insufficient access and/or high demands for space requirements.

DETAILED DESCRIPTION OF THE INVENTION

A cable management support system has various implementations including those depicted herein that are useful for supporting, ordering, and otherwise managing cables near and coupled with communication racks.

Figure 1:
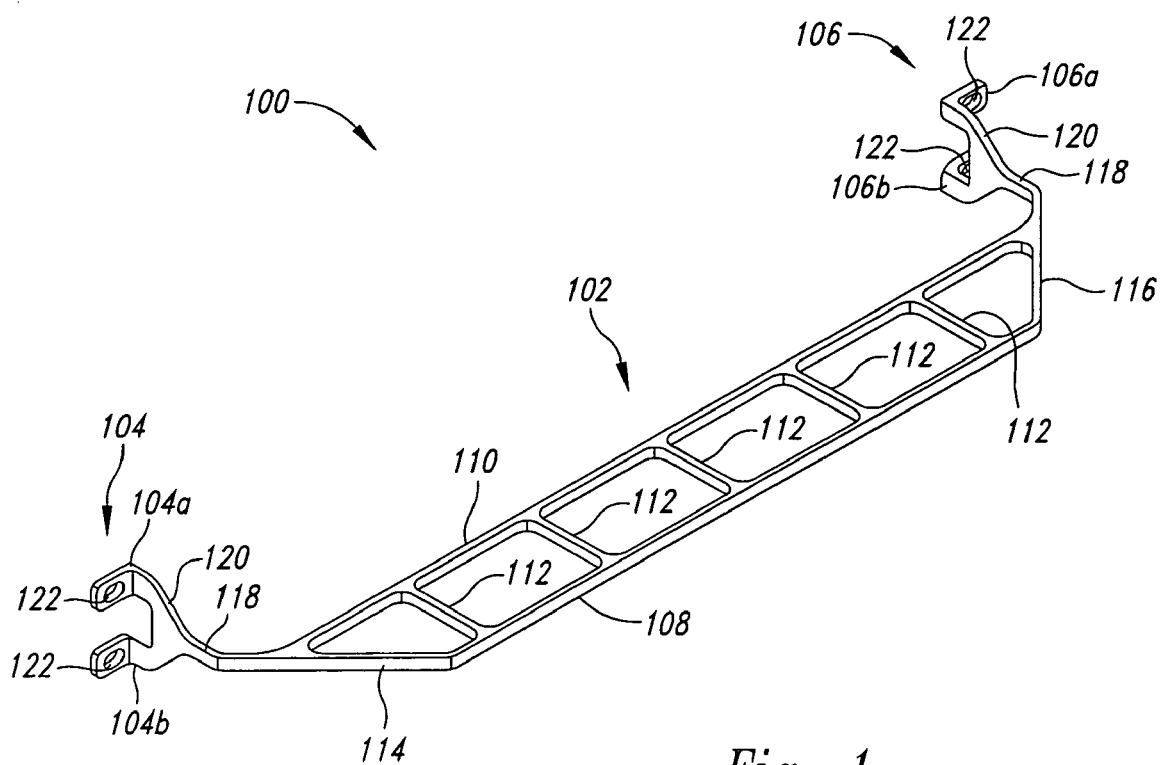
FIG. 1 is a front perspective view of a cable management support system having dual attachment brackets according to a first implementation of the present invention.
Figure 2:
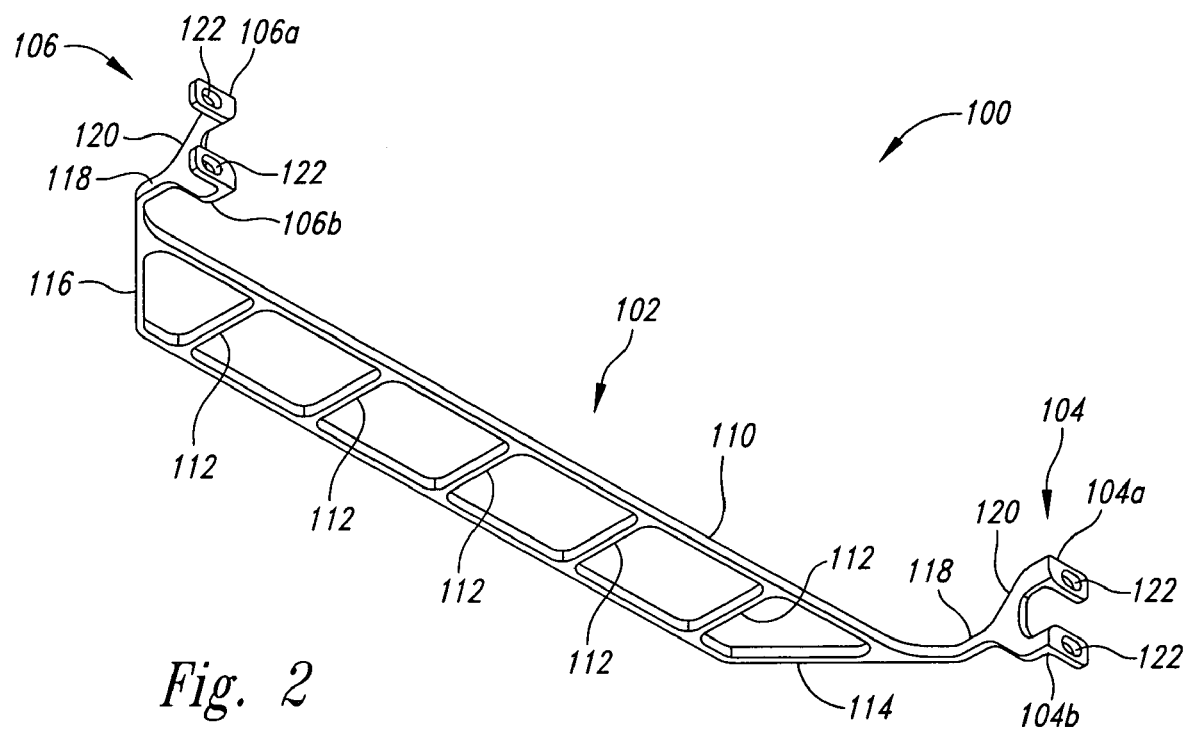
FIG. 2 is a rear perspective view of the cable management support system of FIG. 1.

A first implementation 100 of the cable management support system is shown in FIGS. 1 and 2 as having a first deck 102 extending between a left dual attachment bracket 104 and a right dual attachment bracket 106. The first deck 102 has a front lateral member 108 and a rear lateral member 110 with tie or cross bars 112 extending therebetween. The front lateral member 108, the rear lateral member 110, and the cross bars 112 are so spaced to define openings therebetween that are substantially larger in lateral dimension and in forward dimension than the thickness of the cross bars, and preferably by multiples of such thickness, thus allowing for good access to various cables secured and/or to be secured and the securing devices used. The openings are sized to allow for a user to pass a finger of the hand therethrough to facilitate working with the securing devices used to secure cables to the cross bars. The first deck 102 and other deck implementations have a thin vertical profile to allow various options in cable placement and not significantly block the face of a patch panel or other equipment to which attached.

The first deck 102 also has a left end laterally inwardly angled bar 114 and a right end laterally inwardly angled bar 116 near the left dual attachment bracket 104 and the right dual attachment bracket 106, respectively. Extension portions 118 couple the left end inwardly angled bar 114 and the right end inwardly angled bar 116 to the left dual attachment bracket 104 and the right dual attachment bracket 106, respectively. The extension portions 118 serve to extend the first deck 102 outward from a communication rack to which coupled. Although the extension portions 118 are depicted as a certain size, in other implementations the extension portions can be other sizes to accommodate placement of various implementations of decks, such as the first deck 102.

The left dual attachment bracket 104 and the right dual attachment bracket 106 each have a split portion 120 that each extend from their respective extension portion 118. The split portion 120 vertically locates the first deck 102 approximately mid-way of a rack unit dimension of a communication rack as further discussed below.

The split portion 120 of the left dual attachment bracket 104 is coupled to an upper attachment portion 104a and a lower attachment portion 104b of the left dual attachment bracket 104. Likewise, the split portion 120 of the right dual attachment bracket 106 is coupled to an upper attachment portion 106a and the lower attachment portion 106b of the right dual attachment bracket 106. The upper attachment portion 104a, the lower attachment portion 104b, the upper attachment portion 106a, and the lower attachment portion 106b each have a hole 122 that can be used to receive a bolt for attaching the first implementation 100 to a communication rack.

Figure 3:
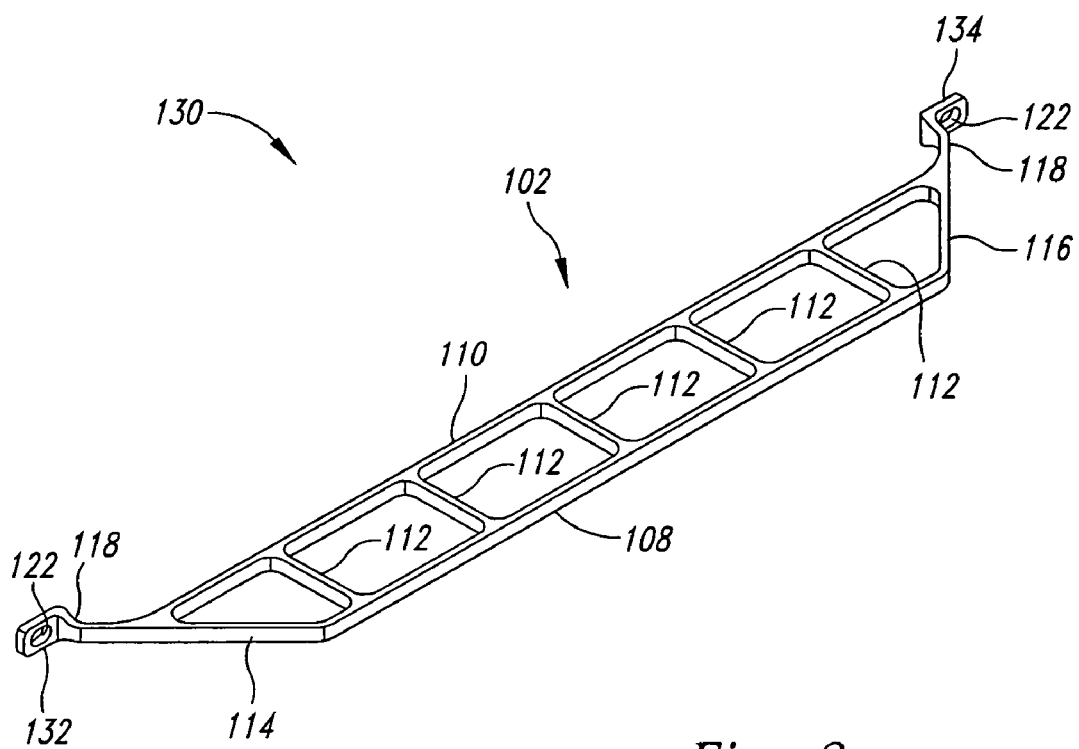
FIG. 3 is a front perspective view of a cable management support system having single attachment brackets according to a second implementation of the present invention.
Figure 4:
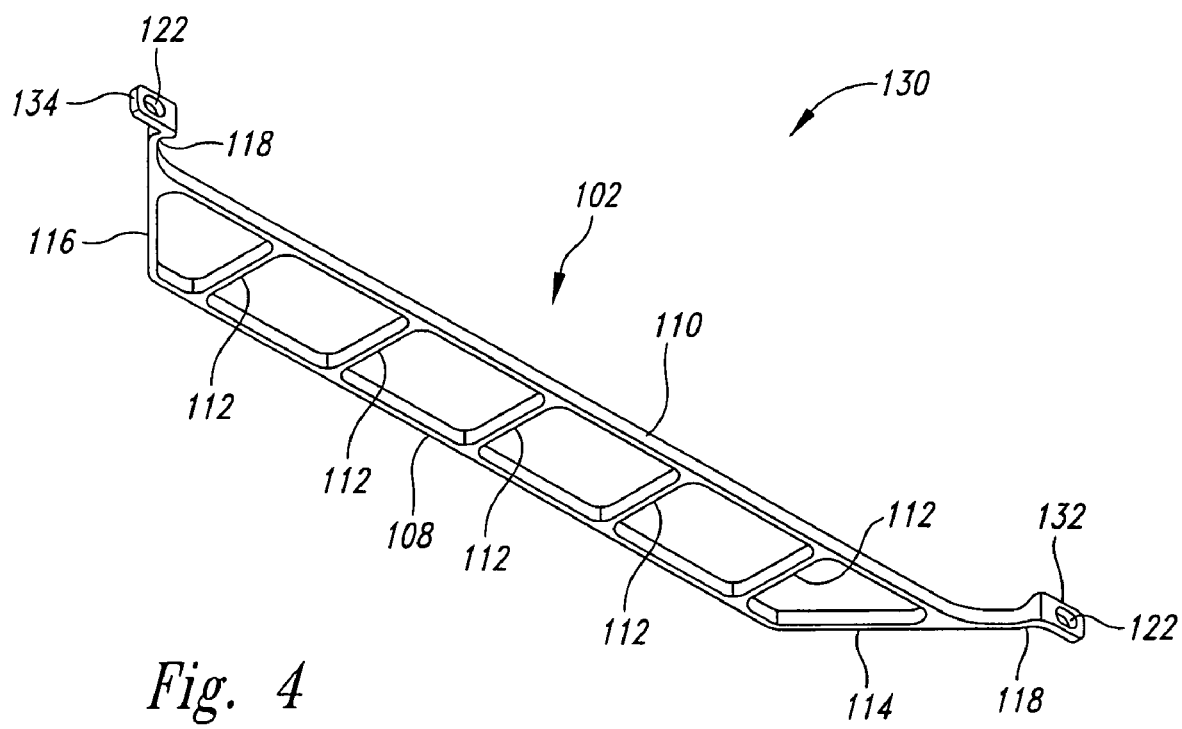
FIG. 4 is a rear perspective view of the cable management support system of FIG. 3.

A second implementation 130 of the system is shown in FIG. 3 and FIG. 4 with the first deck 102 extending between a left single attachment bracket 132 and a right single attachment bracket 134, both having only one hole 122 for attaching to a communication rack.

Figure 5:
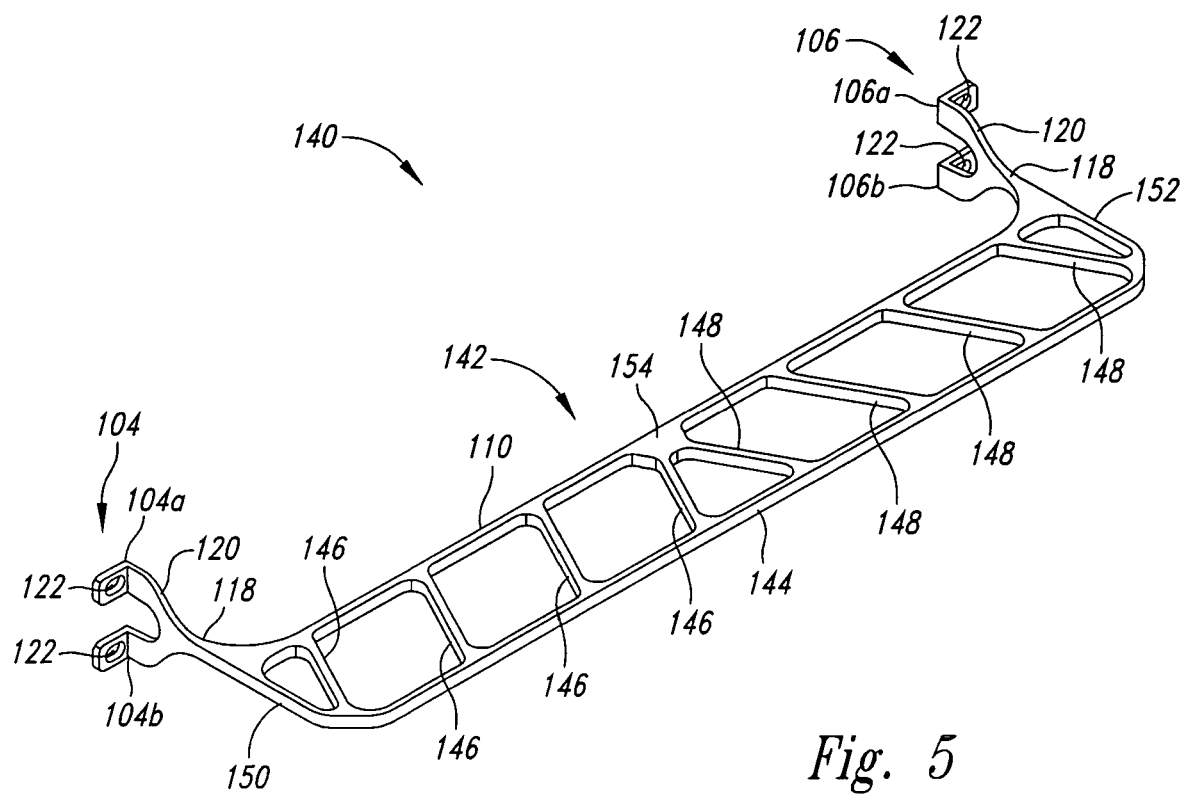
FIG. 5 is a front perspective view of a cable management support system having dual attachment brackets, an expanded deck, and angled cross bars according to a third implementation of the present invention.
Figure 6:
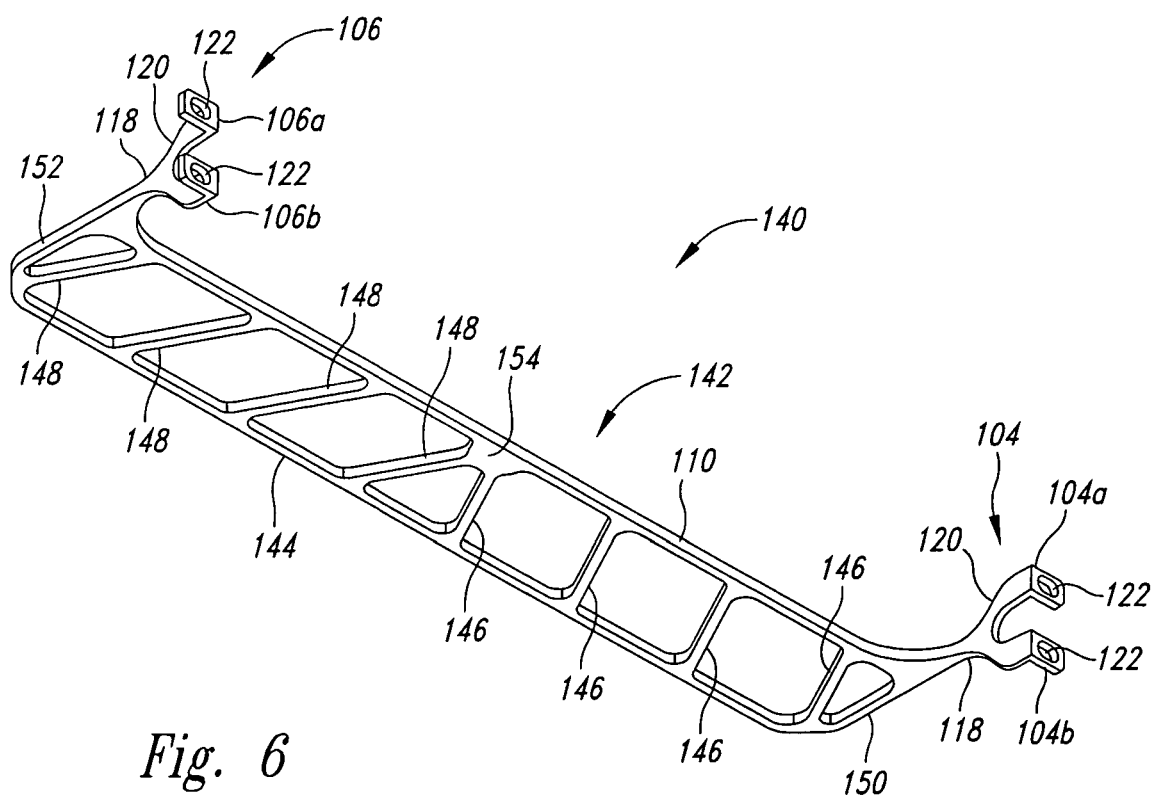
FIG. 6 is a rear perspective view of the cable management support system of FIG. 5.

A third implementation 140 of the system is shown in FIG. 5 and FIG. 6 has having a third deck 142 extending between the left dual attachment bracket 104 and the right dual attachment bracket 106. The third deck 142 has an extended front lateral member 144 and the rear lateral member 110 with laterally outwardly angled left cross bars 146, laterally outwardly angled right cross bars 148, a left end cross bar 150, and a right end cross bar 152 extending therebetween. A mid-portion 154 centrally located in a center longitudinal position of the rear lateral member 110 extends from the rear lateral member to receive the middle most outwardly angled left cross bar 146 and middle most outwardly angled right cross bar 148.

Figure 7:
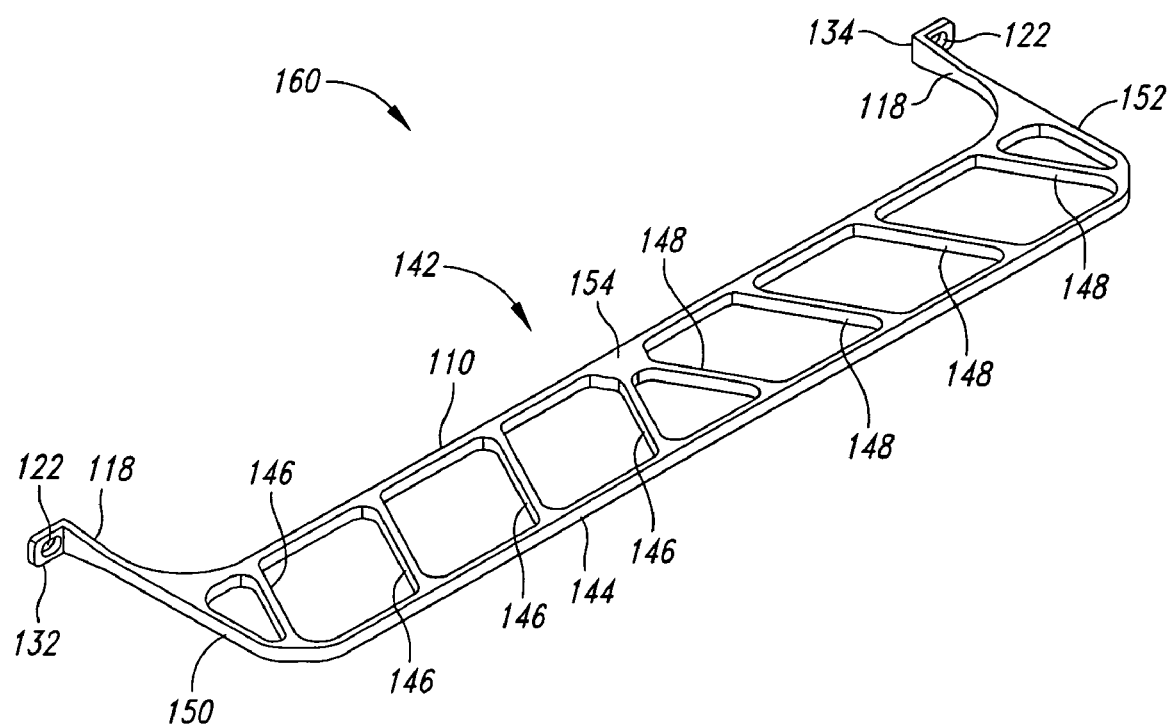
FIG. 7 is a front perspective view of a cable management support system having single attachment brackets, an expanded deck, and angled cross bars according to a fourth implementation of the present invention.
Figure 8:
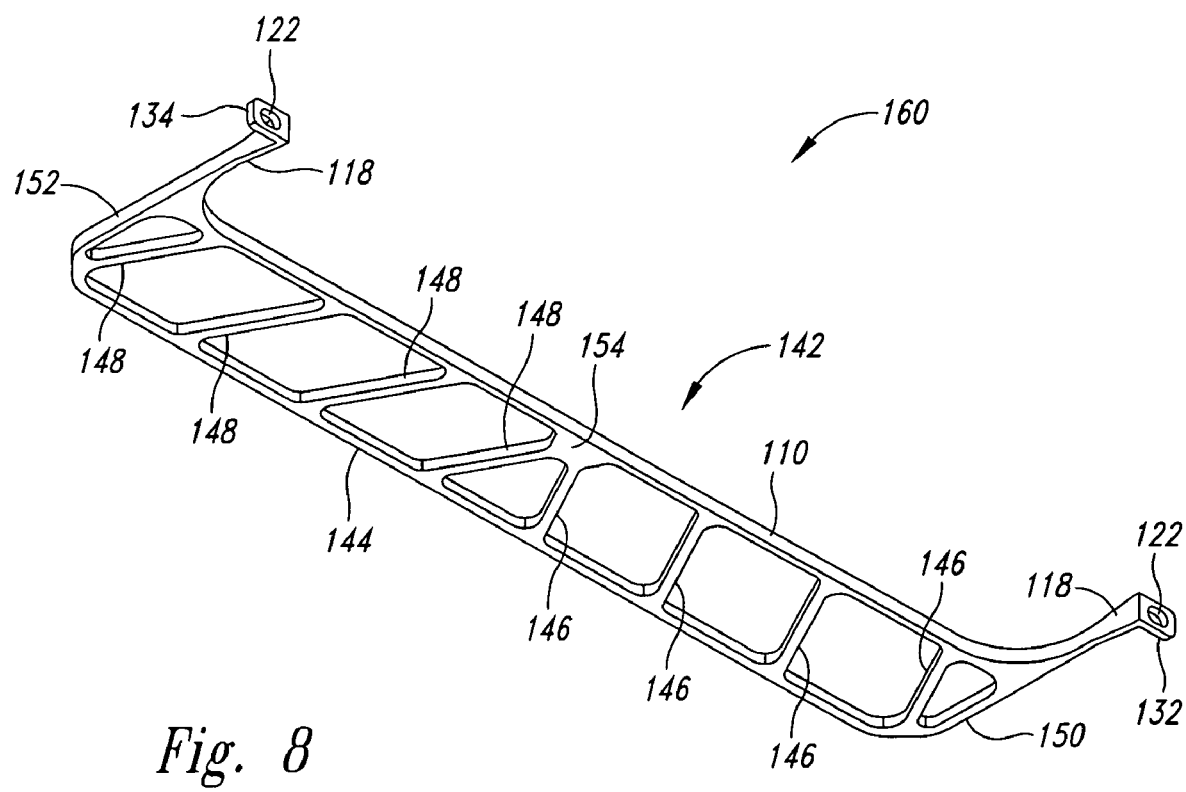
FIG. 8 is a rear perspective view of the cable management support system of FIG. 7.

A fourth implementation 160 as shown in FIG. 7 and FIG. 8 includes the third deck 142 extending between the left single attachment bracket 132 and the right single attachment bracket 134.

Figure 9:
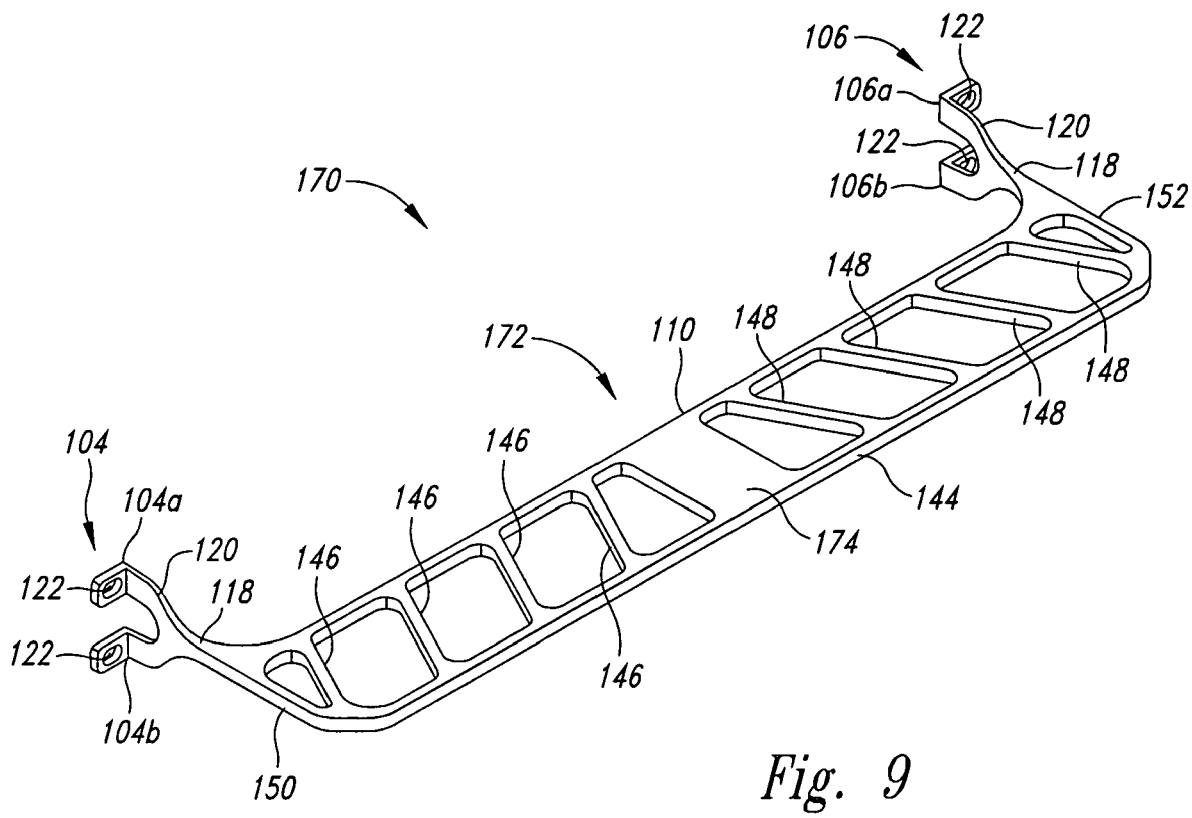
FIG. 9 is a front perspective view of a cable management support system having dual attachment brackets, an expanded deck, angled cross bars, and a solid platform area according to a fifth implementation of the present invention.
Figure 10:
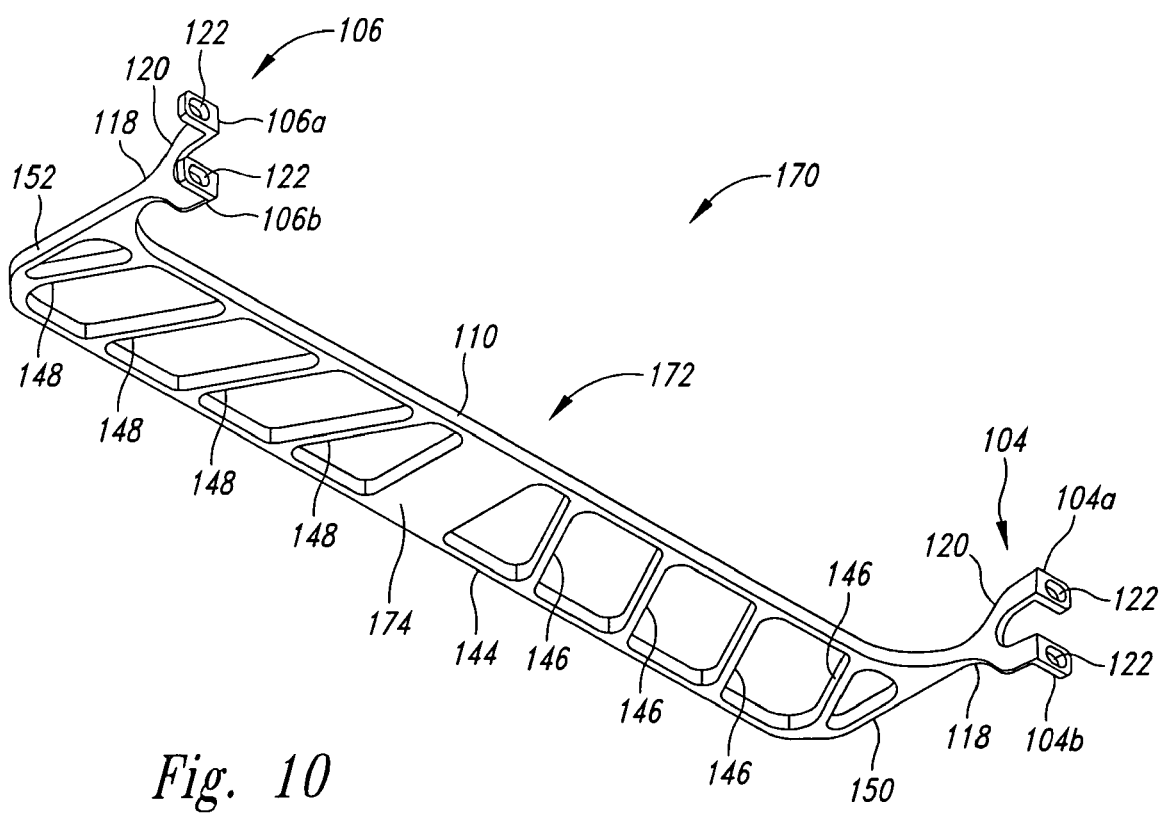
FIG. 10 is a rear perspective view of the cable management support system of FIG. 9.

A fifth implementation 170 as shown in FIG. 9 and FIG. 10 includes a fourth deck 172 extending between the left dual attachment bracket 104 and the right dual attachment bracket 106.

The fourth deck 172 includes the extended front lateral member 144 and the rear lateral member 110 with the outwardly angled left cross bars 146, the outwardly angled right cross bars 148, the left cross bar 150, and the right cross bar 152 extending therebetween. An extended mid-portion 174 extends between the extended front lateral member 144 and the rear lateral member 110.

Placement of the laterally outwardly angled left cross bars 146 and the laterally outwardly angled right cross bars 148 are shifted along the extended front lateral member 144 and the rear lateral member 110 relative to placement of the outwardly angled left cross bars 146 and the outwardly angled right cross bars 148 in the third deck 142 to accommodate the extended mid-portion 174 of the fourth deck.

Figure 11:
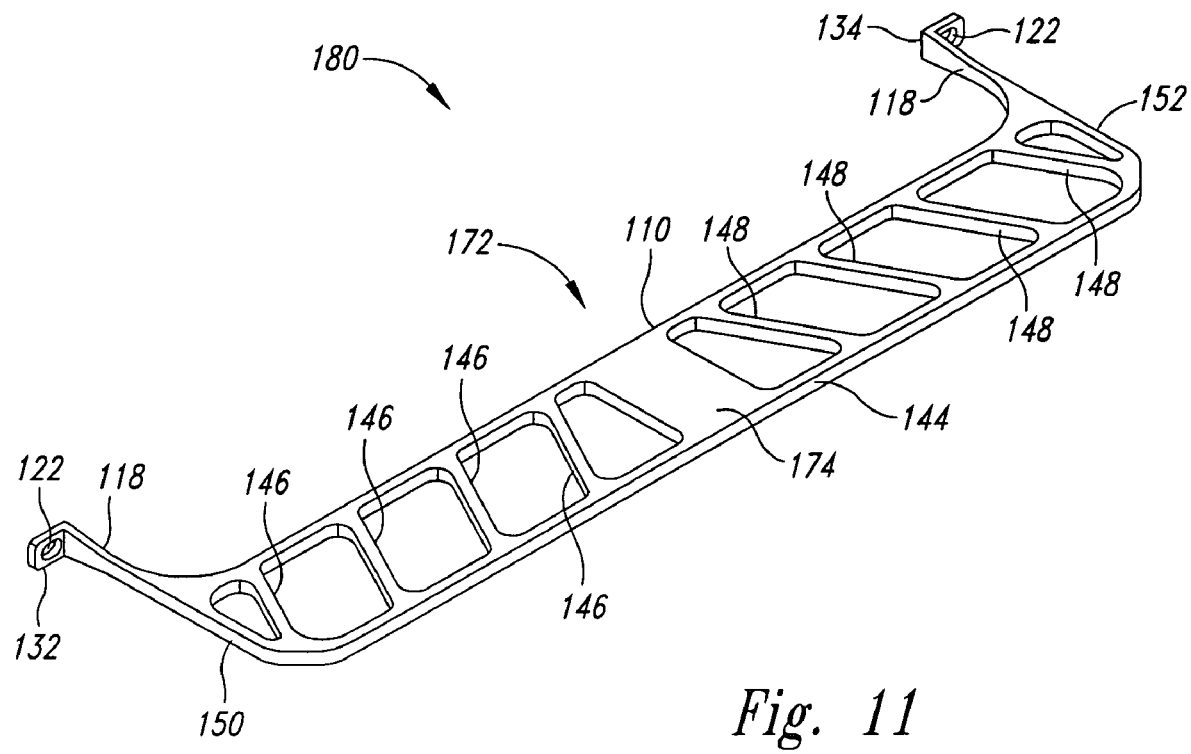
FIG. 11 is a front perspective view of a cable management support system having single attachment brackets, an expanded deck, angled cross bars, and a solid platform area according to a sixth implementation of the present invention.
Figure 12:
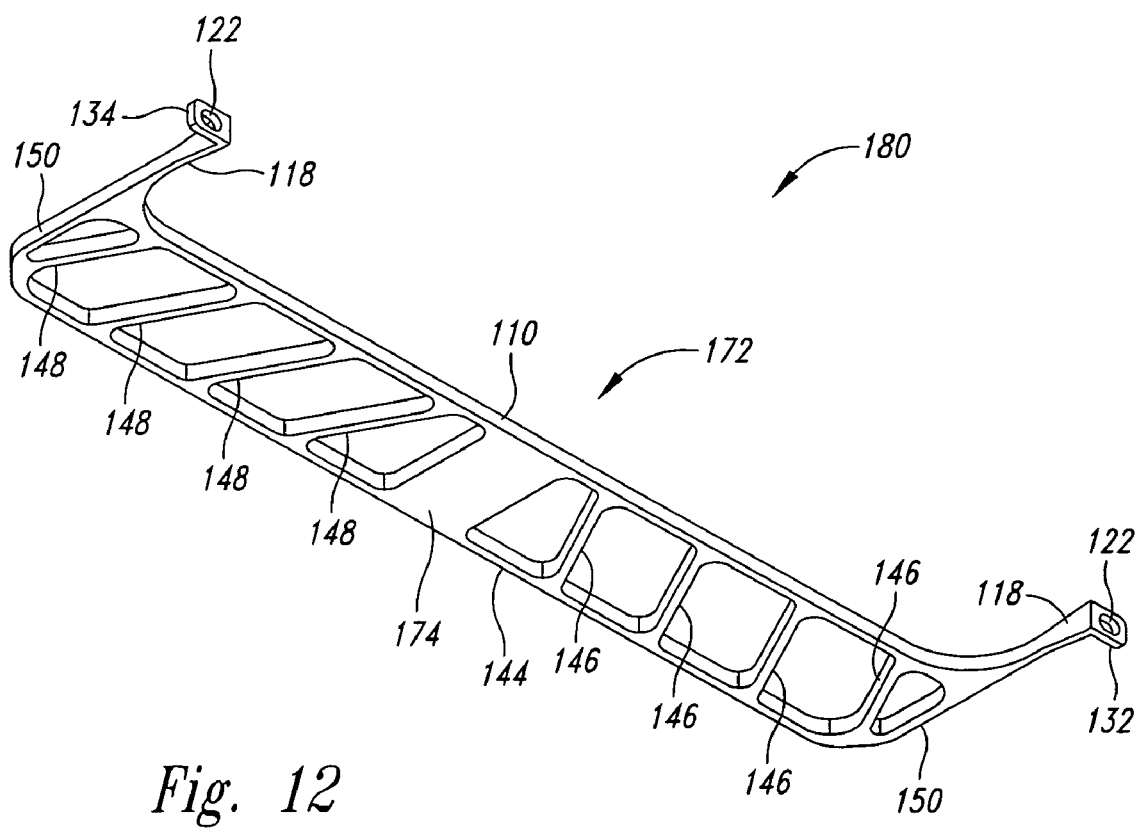
FIG. 12 is a rear perspective view of the cable management support system of FIG. 11.

A sixth implementation 180 as shown in FIG. 11 and FIG. 12 includes the fourth deck 172 extending between the left single attachment bracket 132 and the right single attachment bracket 134.

Figure 13:
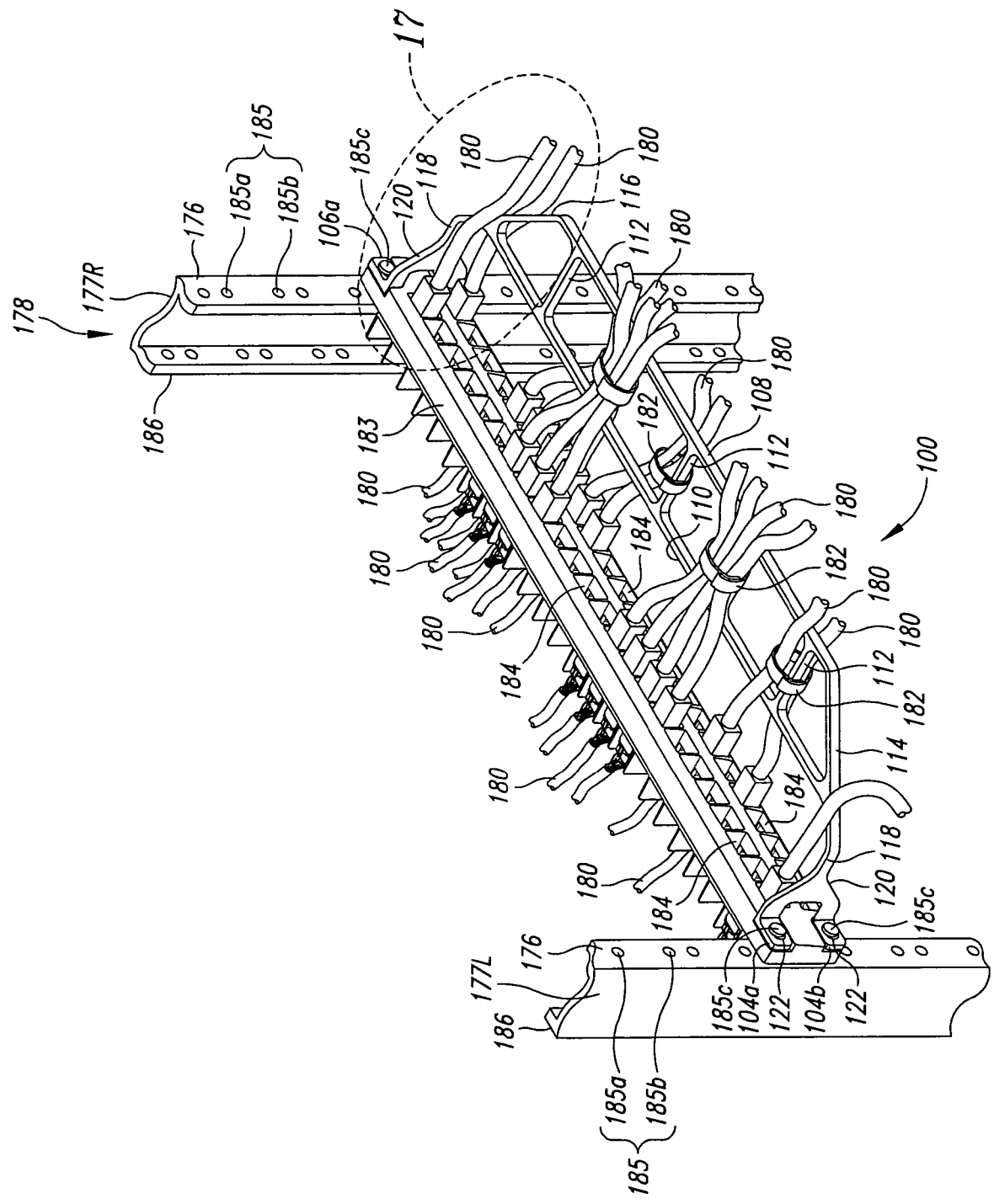
FIG. 13 is a front perspective view of the first implementation of the cable management support system of FIG. 1 shown attached to the front side of a communication rack holding a one RU patch panel.

As shown in FIG. 13, the first implementation 100 can be attached to a front side 176 of a left post 177L and a right post 177R of a communication rack 178 to allow for attachment of cables 180 running over and under the first deck 102. Some of the cables 180 are shown attached to the first deck 102 with straps 182. With use of the left dual attachment bracket 104 and the right dual attachment bracket 106, the first deck 102 is vertically positioned at a mid-portion area of a one rack unit (RU) patch panel 183 from which the cables 180 extend. The patch panel 183 is illustrated with the cables 180 having their connectors inserted into ports 184 of the patch panel. The front side 176 has pairs 185 of top holes 185a and bottom holes 185b that receive bolts 185c to fasten equipment such as the patch panel 184, other types of patch panels, or other equipment to the communication rack 178. Typically each pair 185 of the top hole 185a and the bottom hole 185b are vertically separated by distances that will allow for receipt of various equipment configured to conventional rack unit dimensions. The bolts 185c also extend through the holes 122 to secure the first implementation to the communication rack 178.

Figure 14:
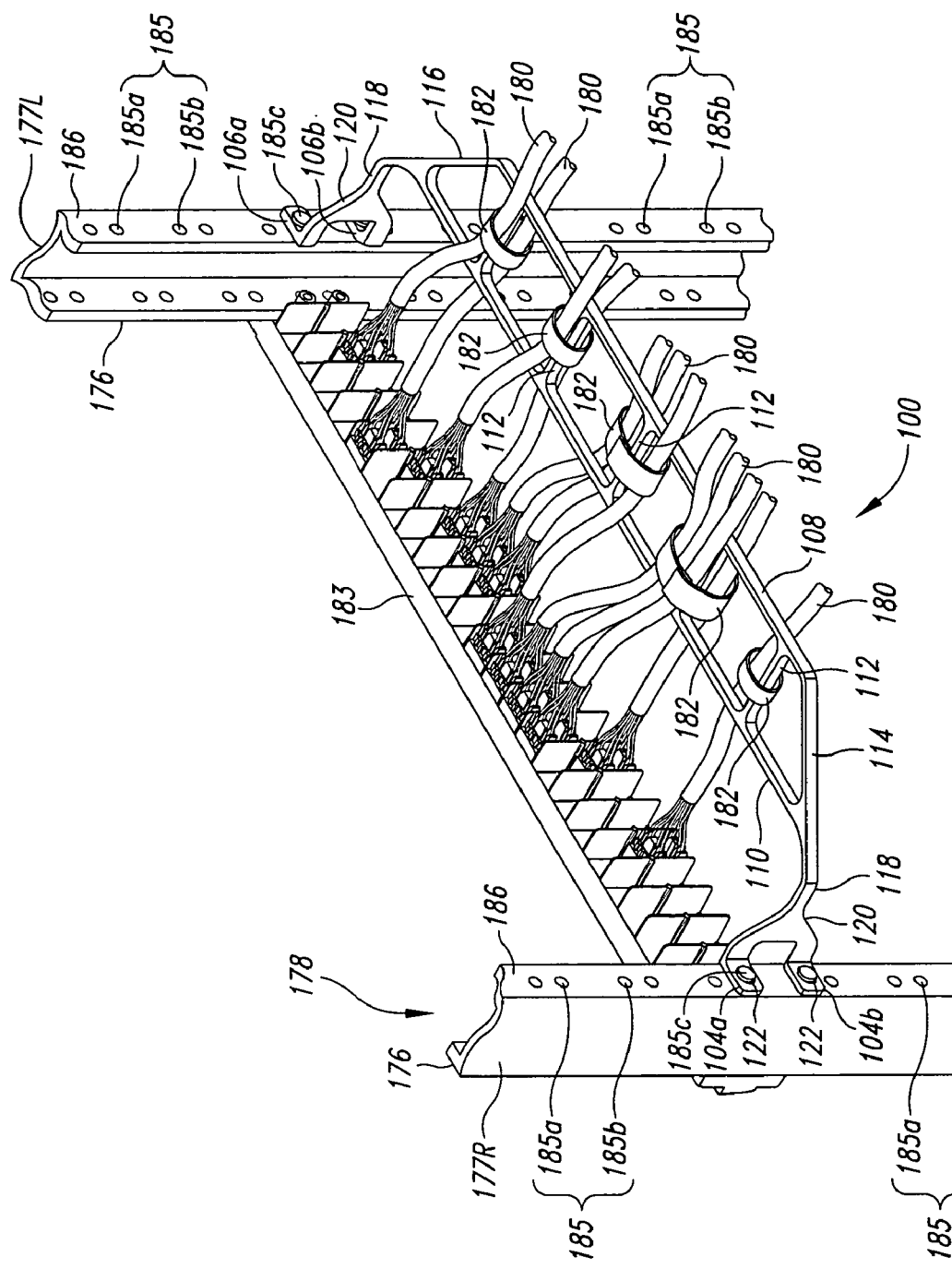
FIG. 14 is a front perspective view of the first implementation of the cable management support system of FIG. 1 shown attached to the rear side of the communication rack holding the one RU patch panel.

The first implementation 100 can also be attached to a rear side 186 of the left and right posts 177L and 177R having pairs 185 of the top holes 185a and the bottom holes 185b for receiving the bolts 185c of the communication rack 178 as shown in FIG. 14.

Figure 15:
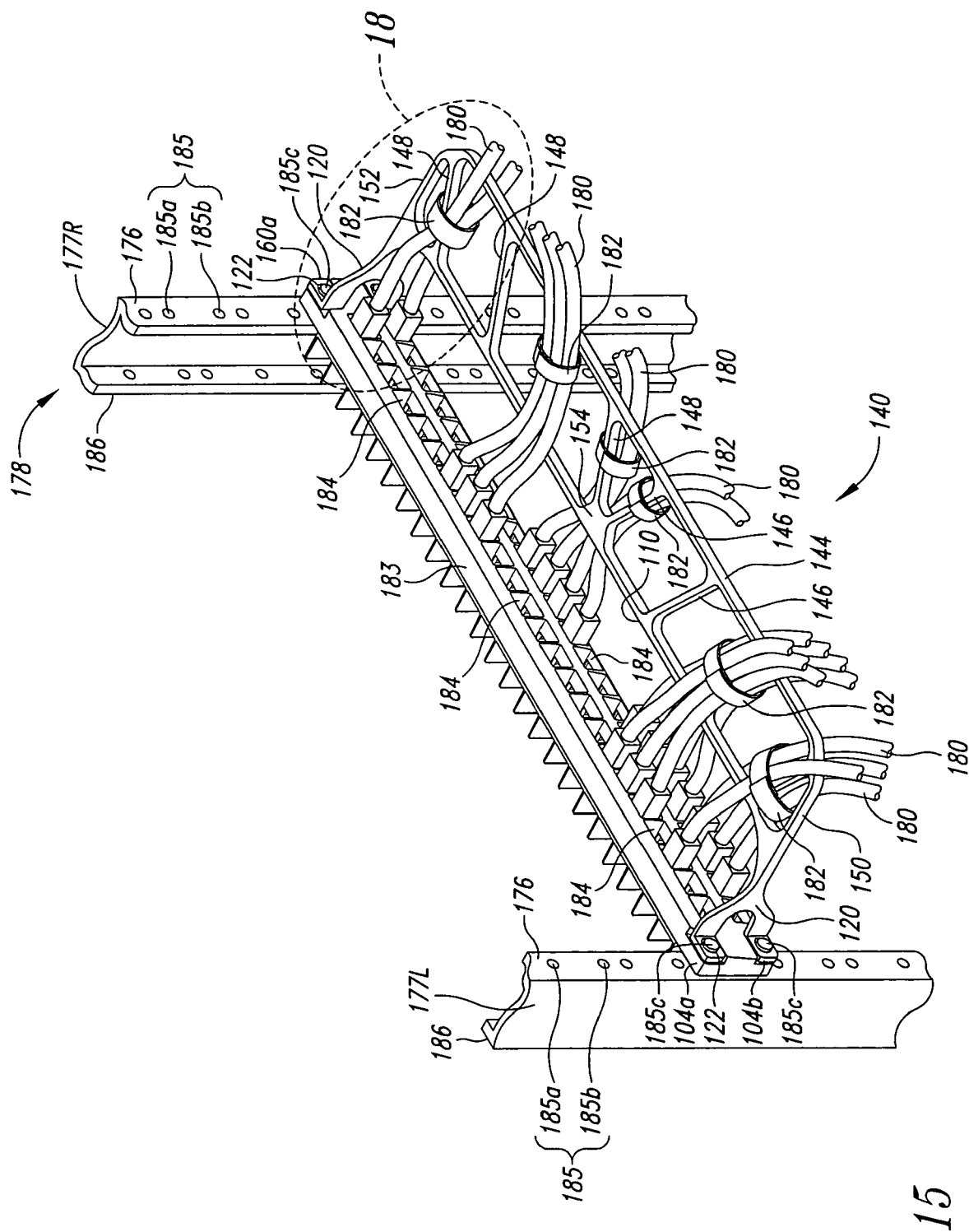
FIG. 15 is a front perspective view of the third implementation of the cable management support system of FIG. 5 shown attached to the front side of a communication rack.

The third implementation 140 is shown attached to the front side 176 of the communication rack 178 in FIG. 15. The outwardly angled left cross bars 146 and the outwardly angled right cross bars 148 allow for angling of the cables 180 attached thereto toward the left and right sides of the communication rack.

Figure 16:
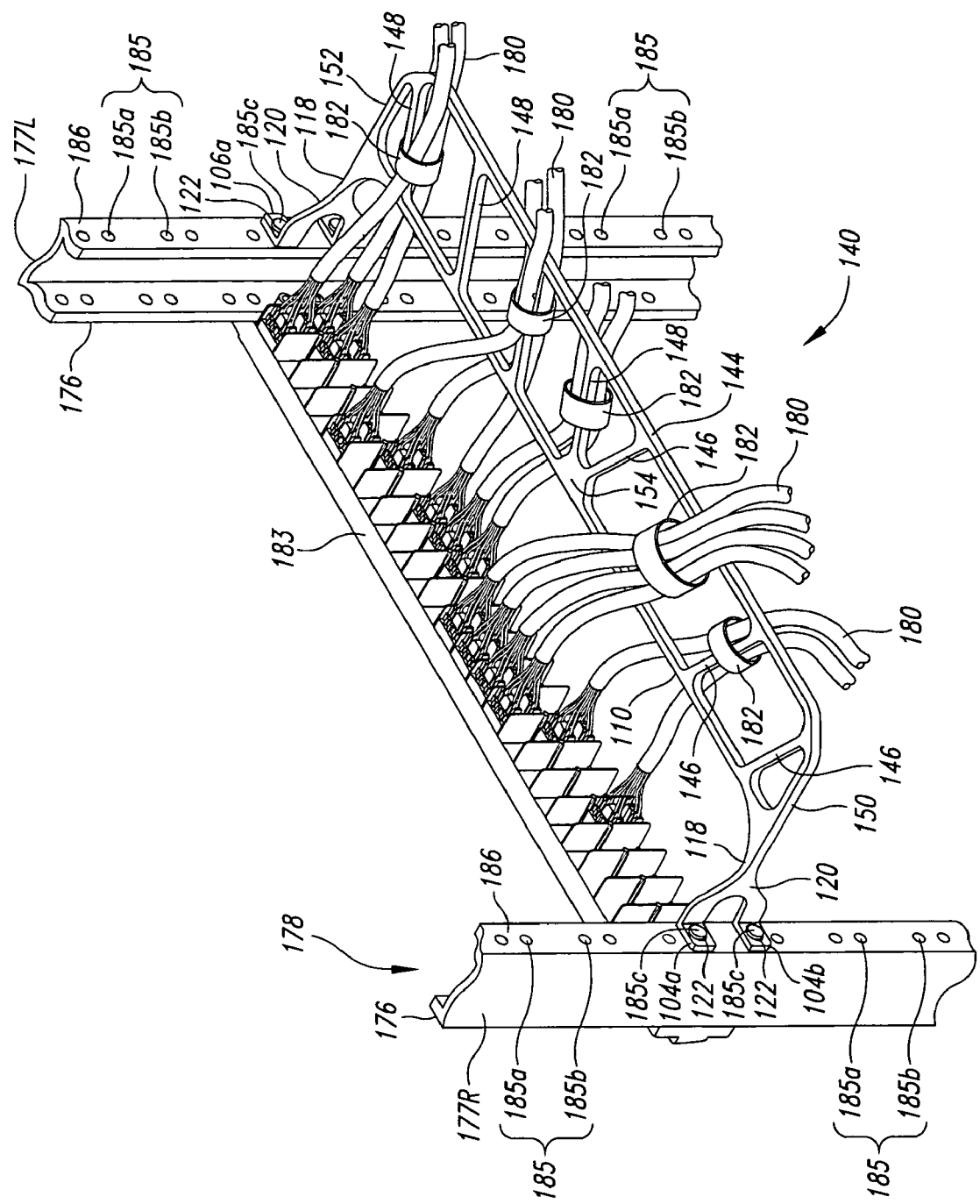
FIG. 16 is a front perspective view of the third implementation of the cable management support system of FIG. 5 shown attached to the rear side of a communication rack.

The third implementation 140 can also be attached to the rear side 186 of the left and right posts 177L and 177R of the communication rack 178 as shown in FIG. 16.

Figure 17:
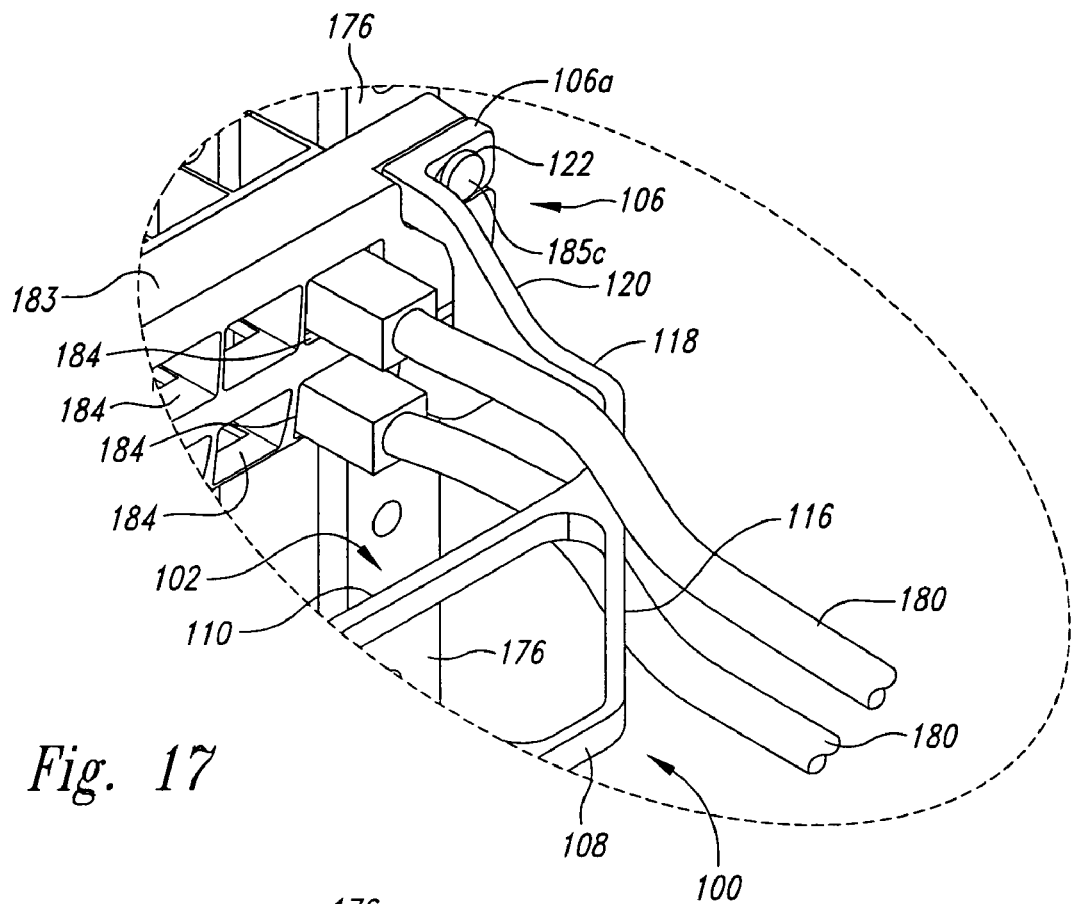
FIG. 17 is an enlarged view of a portion of FIG. 13 showing detail regarding securing cables along an end portion of the first implementation of the cable management support system.
Figure 18:
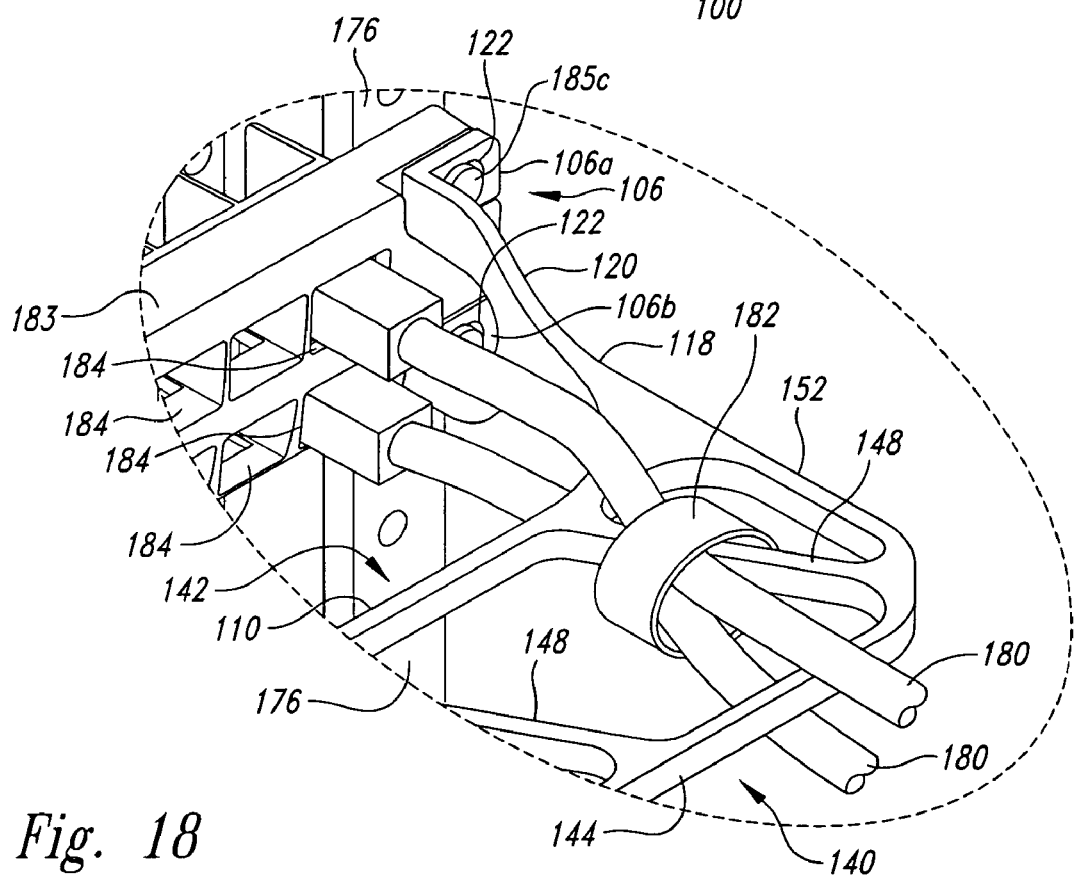
FIG. 18 is an enlarged view of a portion of FIG. 15 showing detail regarding securing cables along an end portion of the third implementation of the cable management support system.

FIG. 17 illustrates for the right side of the first deck 102 that there is not as much availability for securing thereto cables which are extending from the pair of ports of the patch panel 184 adjacent to extension portion 118. The right end inwardly angled bar 116 of the first deck 102 is positioned too far laterally inward and not directly in front of the ports. The same is true for the left side of the first deck 102. The availability for securing cables which are extending from the pair of ports of the patch panel 184 adjacent to extension portion 118 is greatly improved in the designs of the third deck 142 by the extended front lateral member 144 that projects laterally outward farther and provides an outwardly angled right cross bar 148 positioned immediately forward of this pair of ports of the patch panel to which cables can be secured as shown in FIG. 18. The same is true for the left side of the of the third deck 142. The same design feature is used with the of the fourth deck 172.

Figure 19:
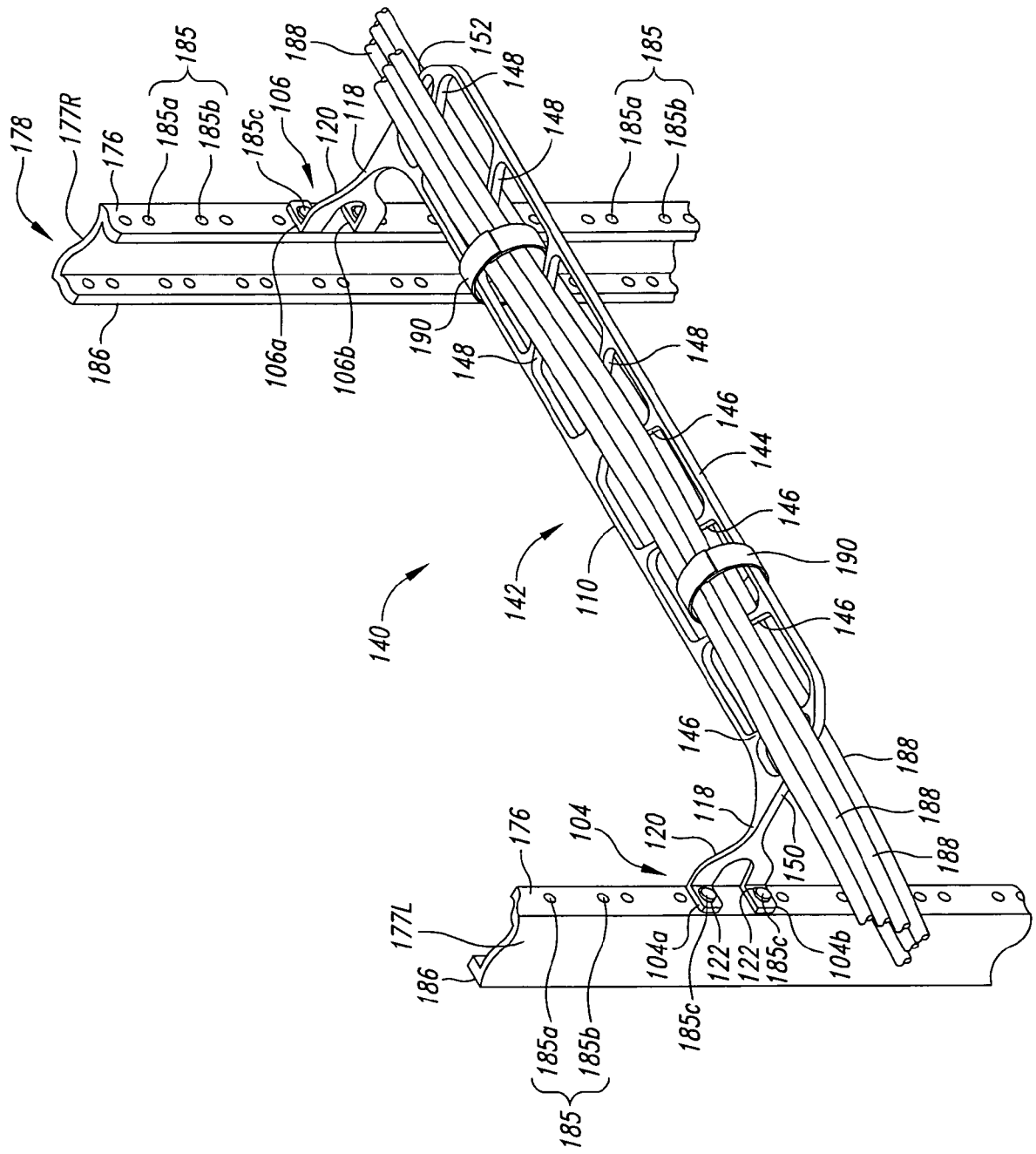
FIG. 19 is a front perspective view of the third implementation of the cable management support system of FIG. 5 shown attached to the a communication rack and acting as a shelf to hold a group of cables.

As shown in FIG. 19, the third implementation 140, as well as the other implementations, can serve as a shelf to hold a group of cables 188 strapped with large straps 190 to the third deck 142 as a bundle of cables.

Figure 20:
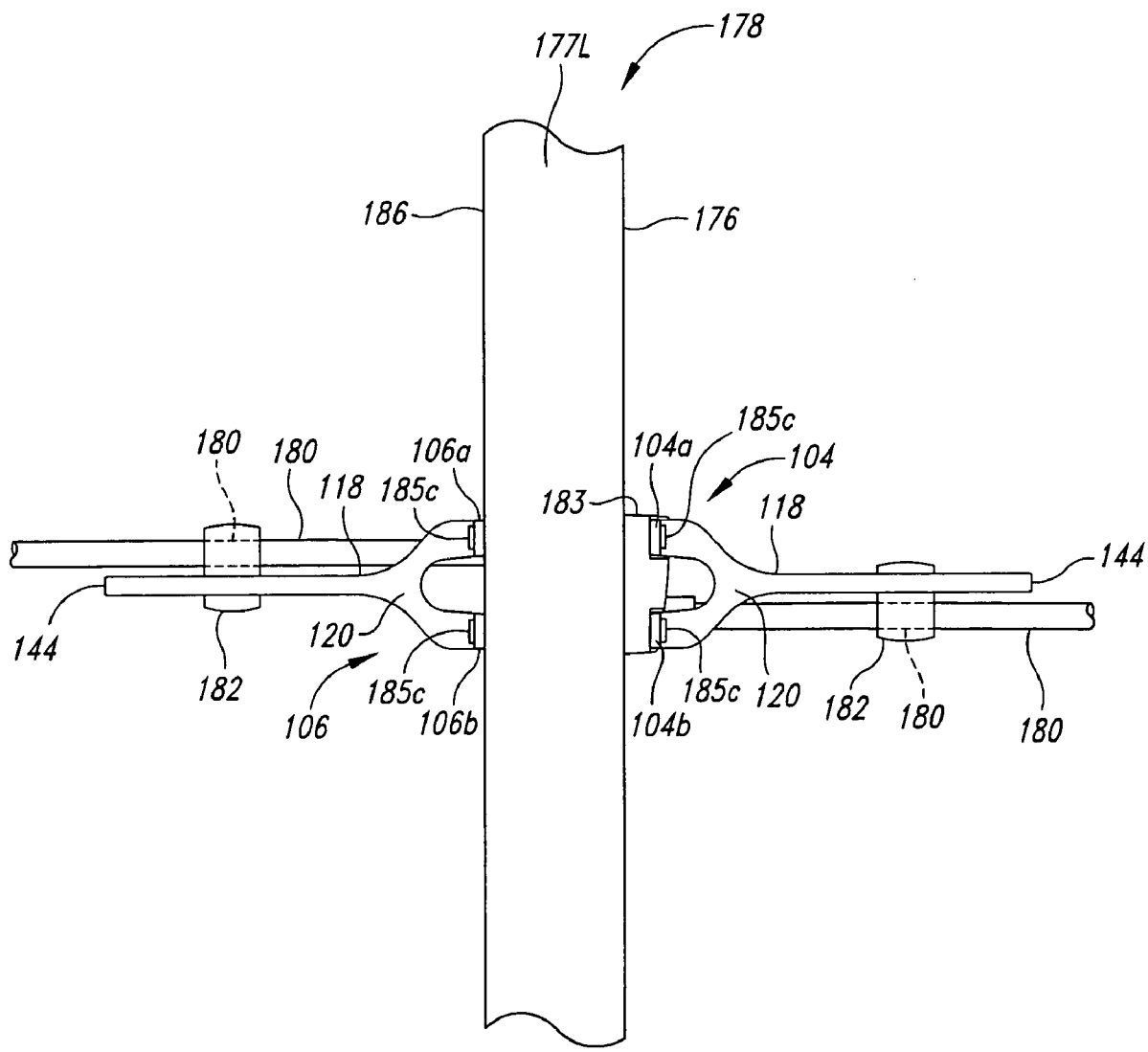
FIG. 20 is a side elevational view of a first cable management support system and a second cable management support system both having the dual attachment bracket and attached to the front and rear side, respectively, of a communication rack with a first cable being supported above the first cable management support system and a second cable being supported below the second cable management support system.

As shown in FIG. 20, various implementations of the system can be attached to both the front side 176 and the rear side 186 of the communication rack 178 allowing for connection of cables 180 extending from either the front side and/or the rear side of the communication rack, above and/or below the deck of the implementation.

Figure 21:
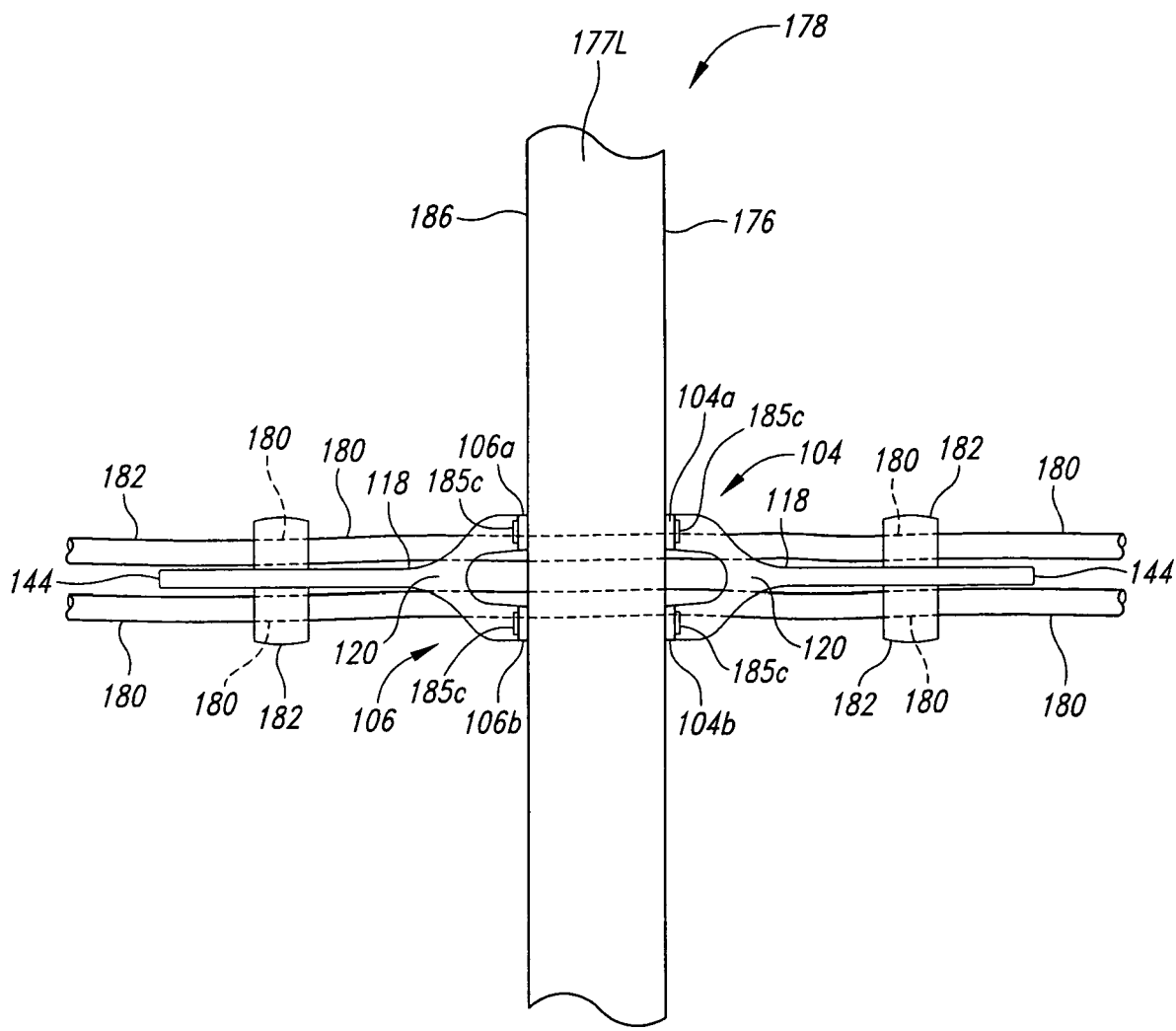
FIG. 21 is a side elevational view of a first cable management support system and a second cable management support system both having the dual attachment bracket and attached to the front and rear side, respectively, of a communication rack with a first cable being supported above and a second cable being support below both the first cable management support system and the second cable management support system wherein both the first cable and the second cable are passing through the communication rack.

As shown in FIG. 21, two decks of the system, one attached to the front side 176 and one attached to the rear side 186 of the communication rack 178, can also allow for pass through of cables 192 through the communication rack between the front and rear sides of the communication rack.

Figure 22:
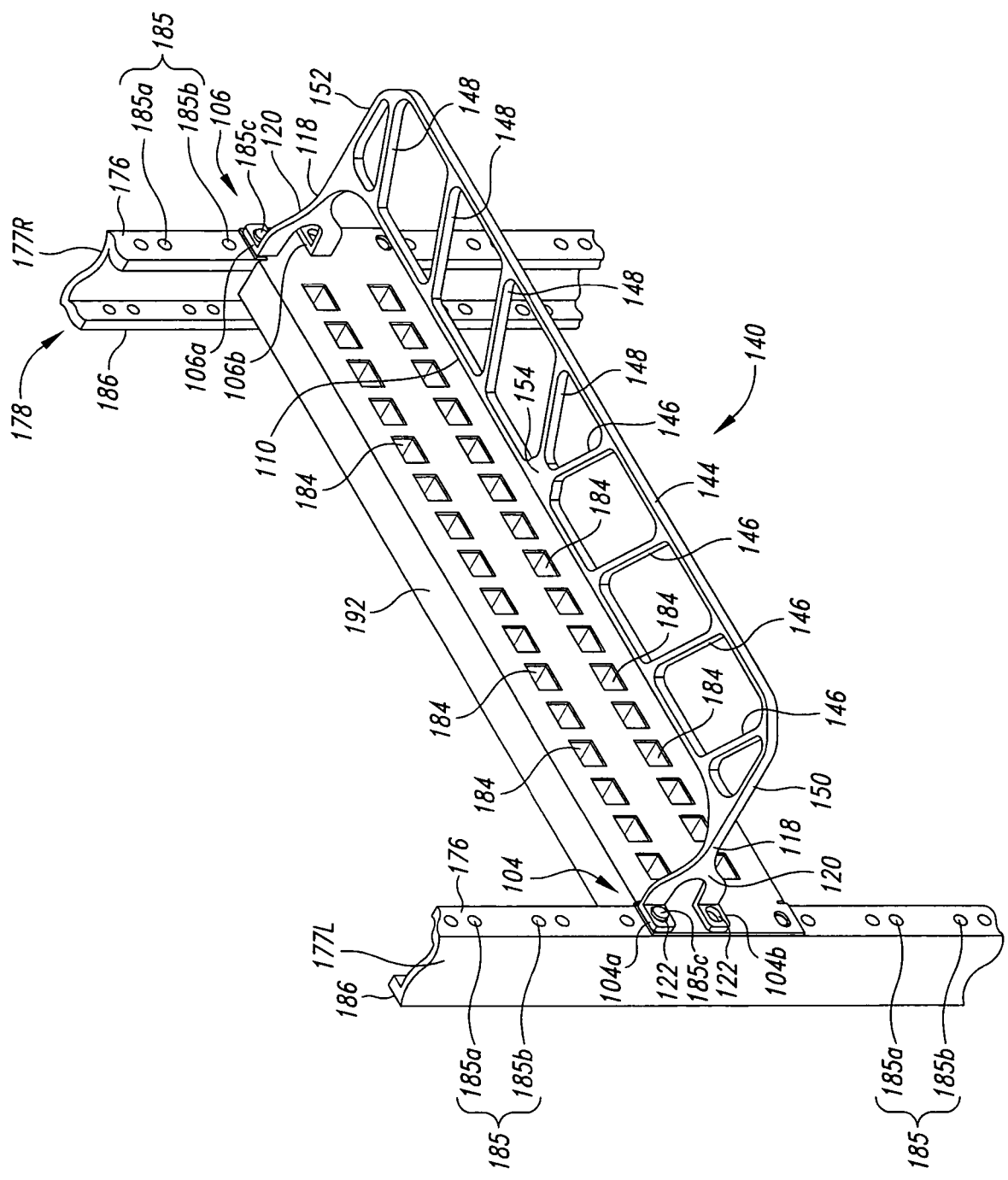
FIG. 22 is a front perspective view of the third implementation of the cable management support system of FIG. 5 shown attached to the front side of a communication rack holding a two RU patch panel.

As shown in FIG. 22, the third implementation 140 can be attached to the front side 176 of the communication rack 178 that is holding a two RU patch panel 192. Only the upper attachment portion 104*a* and the upper attachment portion 106*a* of the left and right dual attachment brackets 104 and 106 are bolted to the communication rack 178 since the height of the two RU patch panel 192 does not allow for further bolting of the lower attachment portion 104*b* and the lower attachment portion 106*b* when the upper attachment portions are bolted.

Figure 23:
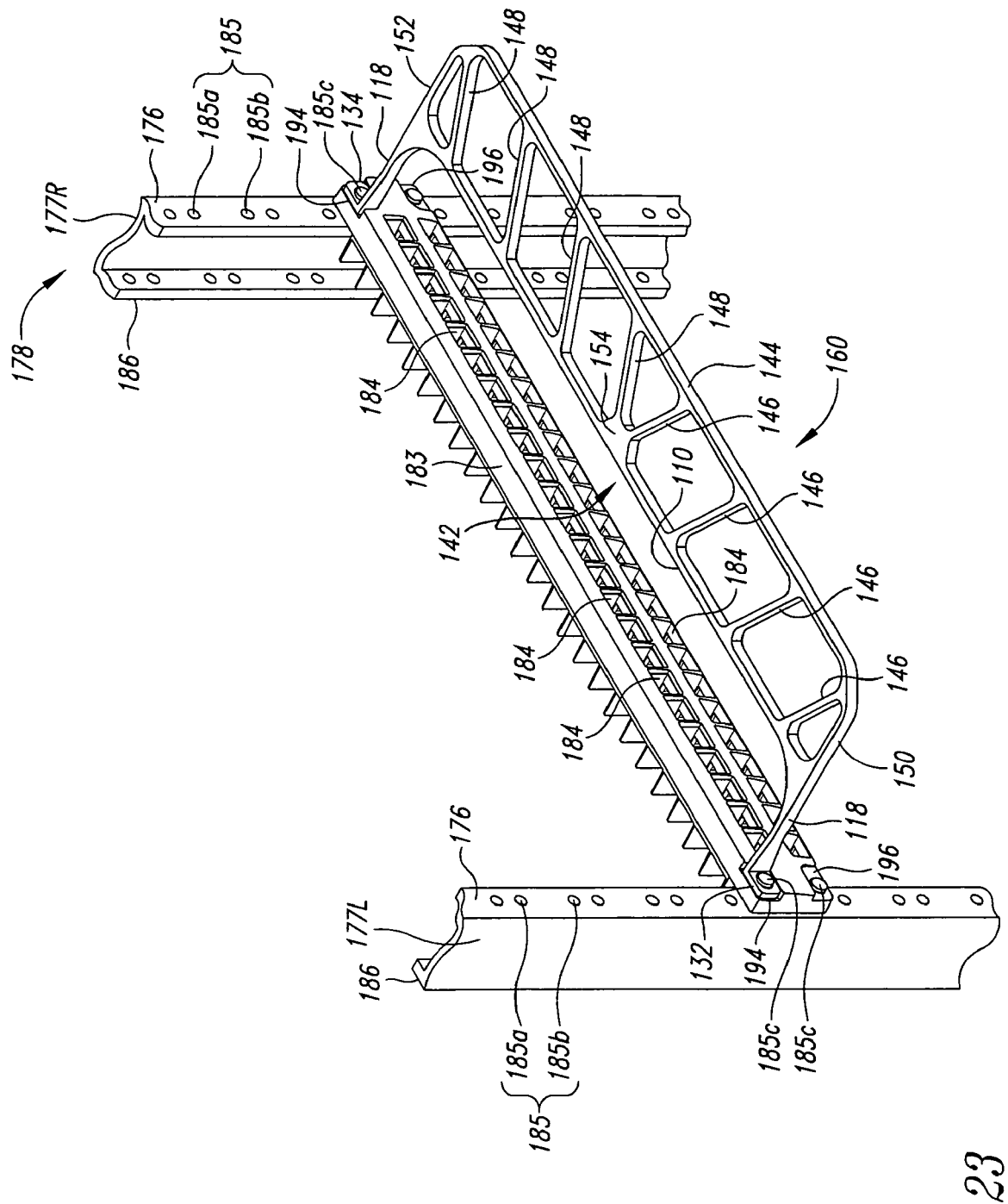
FIG. 23 is a front perspective view of the fourth implementation of the cable management support system of FIG. 7 shown attached to the front side of the communication rack holding the one RU patch panel.

As shown in FIG. 23, the fourth implementation 160 using the left single attachment bracket 132 and the right single attachment bracket 134 can be bolted to the communication rack 178 with a one RU patch panel 183 having upper attachment positions 194 and lower attachment positions 196. Although the fourth implementation 160 is shown bolted to the upper attachment positions 196, the fourth implementation can also be bolted to the lower attachment positions 196.

Implementations of the system can be made from rigid metals, such as die cast aluminum, zinc, and other metals or rigid plastics.

It will be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiments, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims filed and the equivalents thereof.

The invention claimed is:

1. For use with a communication rack having a first post and a second post, the first post and the second post each having a front side and a rear side, a cable support comprising:
   a first attachment bracket attachable to the front side of the first post and attachable to the rear side of the first post;
   a second attachment bracket attachable to the front side of the second post and attachable to the rear side of the second post;
   a first lateral member extending between the first attachment bracket and the second attachment bracket, the first lateral member having a first portion attached to the first attachment bracket and a second portion attached to the second attachment bracket;
   a second lateral member extending between the first attachment bracket and the second attachment bracket, the first lateral member and the second lateral member spaced from one another; and
   a plurality of cross bars extending between the first lateral member and the second lateral member, the cross bars forwardly projecting away from the communication rack when the first attachment bracket is attached to the front side of the first post and the second attachment bracket is attached to the front side of the second post, the cross bars rearwardly projecting away from the communication rack when the first attachment bracket is attached to the rear side of the first post and the second attachment bracket is attached to the rear side of the second post.

2. The cable support of claim 1 wherein the cross bars extend perpendicular from the first lateral member and the second lateral member.

3. The cable support of claim 1 wherein the first and second lateral members each include a left side portion and a right side portion with a center portion therebetween, and the cross bars include a plurality of left side cross bars extending at a laterally outward angle from the left side portion of the first lateral member to the left side portion of the second lateral member, and a plurality of right side cross bars extending at a laterally outward angle from the right side portion of the first lateral member to the right side portion of the second lateral member, the left side cross bars and the right side cross bars being positioned closer to the center portion of the first lateral member than the center portion of the second lateral member.

4. The cable support of claim 1 wherein the first lateral member has a longitudinal dimension and has a central portion along the longitudinal dimension, a first portion along the longitudinal dimension to a first lateral side of the central portion and a second portion along the longitudinal dimension to a second lateral side of the central portion opposite the first lateral side, and the second lateral member has a longitudinal dimension and has a central portion along the longitudinal dimension, a first portion along the longitudinal dimension to a first lateral side of the central portion and a second portion along the longitudinal dimension to a second lateral side of the central portion opposite the first lateral side, and wherein the cross bars include at least one central cross bar extending between the central portions of the first and second lateral members, a plurality of first cross bars extending between the first portions of the first and second lateral members, and a plurality of second cross bars extending between the second portions of the first and second lateral members.

5. The cable support of claim 1, further comprising extension portions extending between the first attachment bracket and the first lateral member and between the second attachment bracket and the second lateral member.

6. For use with a communication rack having a first post and a second post, a cable support comprising:
   a first attachment bracket attachable to the first post;
   a second attachment bracket attachable to the second post;
   a first lateral member extending between the first attachment bracket and the second attachment bracket, the first lateral member having a first portion attached to the first attachment bracket and a second portion attached to the second attachment bracket;
   a second lateral member extending between the first attachment bracket and the second attachment bracket, the first lateral member and the second lateral member spaced from one another; and a plurality of cross bars extending between the first lateral member and the second lateral member wherein the cross bars extend between the first lateral member and the second lateral member at a non-perpendicular angle.

7. For use with a communication rack having a first post and a second post, a cable support comprising:

a first attachment bracket attachable to the first post;

a second attachment bracket attachable to the second post;

a first lateral member extending between the first attachment bracket and the second attachment bracket, the first lateral member having a first portion attached to the first attachment bracket and a second portion attached to the second attachment bracket;

a second lateral member extending between the first attachment bracket and the second attachment bracket, the first lateral member and the second lateral member spaced from one another;

a plurality of cross bars extending between the first lateral member and the second lateral member; and a mid-portion extending partially from the first lateral member toward the second lateral member, the mid-portion being substantially wider than the cross bars.

8. The cable support of claim 7 further comprising at least one cross bar extending from the mid-portion to the second lateral member.

9. The cable support of claim 1 further comprising a mid-portion extending fully between the first lateral member and the second lateral member, the mid-portion being wider than the cross bars.

10. The cable support of claim 1 wherein the first lateral member is positioned a first distance from the first attachment bracket and from the second attachment bracket, and the second lateral member is positioned a second distance from the first attachment bracket and from the second attachment bracket, the second distance being larger than the first distance.

11. The cable support of claim 10 wherein the cross bars extend perpendicular from the first lateral member and the second lateral member.

12. The cable support of claim 10 wherein the first lateral member and the second lateral member have substantially the same length.

13. For use with a communication rack having a first post and a second post, a cable support comprising:

a first attachment bracket attachable to the first post;

a second attachment bracket attachable to the second post;

a first lateral member extending between the first attachment bracket and the second attachment bracket, the first lateral member having a first portion attached to the first attachment bracket and a second portion attached to the second attachment bracket;

a second lateral member extending between the first attachment bracket and the second attachment bracket, the first lateral member and the second lateral member spaced from one another; and a plurality of cross bars extending between the first lateral member and the second lateral member wherein the first lateral member has a length larger than the second lateral member.

14. The cable support of claim 13, further comprising a left end inwardly angled bar and a right end inwardly angled bar, wherein the first lateral member has a left end and a right end and the second lateral member has a left end and a right, the left end inwardly angled bar extending between the left end of the first lateral member and the left end of the second lateral member, and the right end inwardly angled bar extending between the right end of the first lateral member and the right end of the second lateral member.

15. The cable support of claim 1 for use with the first post having vertically spaced holes and the second post having vertically spaced holes, wherein the first attachment bracket has a hole and the second attachment bracket has a hole, the hole of the first attachment bracket positoned to receive an attachment member therethrough that is also passing through one of the vertically spaced holes of the first post when another attachment member is passing through both one of the vertically spaced holes of the second post and the hole of the second attachment bracket.

16. The cable management support of claim 15 wherein the hole of the first attachment bracket and the hole of the second attachment bracket are oriented to vertically position the first lateral member and the second lateral member substantially between two of the vertically spaced holes of the first post and two of the vertically spaced holes of the second post.

17. The cable support of claim 1 for use with the first post having vertically spaced holes and the second post having vertically spaced holes, wherein the first attachment bracket has two holes spaced to align with two of the vertically spaced holes of the first post and the second attachment bracket has two holes spaced to align with two of the vertically spaced holes of the second post.

18. The cable management support of claim 17 wherein the two holes of the first attachment bracket and the two holes of the second attachment bracket are oriented to vertically position the first lateral member and the second lateral member substantially between two of the vertically spaced holes of the first post and two of the vertically spaced holes of the second post.

19. A cable support shelf for use with a communication rack having a front side, the cable support shelf comprising:

a first attachment bracket couplable to the front side of the communication rack regardless of positioning of equipment coupled within the communication rack;

a second attachment bracket couplable to the front side of the communication rack regardless of positioning of equipment coupled within the communication rack;

a first lateral member extending laterally between the first attachment bracket and the second attachment bracket, the first lateral member having a first portion attached to the first attachment bracket and a second portion attached to the second attachment bracket;

a second lateral member extending laterally and spaced away from the first lateral member; and a plurality of tie members extending between the first and second lateral members, the plurality of tie members forwardly projecting away from the front side of the rack when the first attachment bracket and the second attachment bracket are coupled to the front side of the rack.

20. The cable support of claim 19 wherein the tie members extend perpendicular from the first lateral member and the second lateral member.

21. The cable support of claim 19 wherein the first and second lateral members each include a left side portion and a right side portion with a center portion therebetween, and the tie members include a plurality of left side tie members extending at a laterally outward angle from the left side portion of the first lateral member to the left side portion of the second lateral member, and a plurality of right side tie members extending at a laterally outward angle from the right side portion of the first lateral member to the right side portion of the second lateral member, the left side cross bars and the right side cross bars being positioned closer to the center portion of the first lateral member than the center portion of the second lateral member.

22. The cable support of claim 19 wherein the first lateral member has a longitudinal dimension and has a central portion along the longitudinal dimension, a first portion along the longitudinal dimension to a first lateral side of the central portion and a second portion along the longitudinal dimension to a second lateral side of the central portion opposite the first lateral side, and the second lateral member has a longitudinal dimension and has a central portion along the longitudinal dimension, a first portion along the longitudinal dimension to a first lateral side of the central portion and a second portion along the longitudinal dimension to a second lateral side of the central portion opposite the first lateral side, and wherein the cross members include at least one central cross member extending between the central portions of the first and second lateral members, a plurality of first cross members extending between the first portions of the first and second lateral members, and a plurality of second cross members extending between the second portions of the first and second lateral members.

23. The cable support of claim 19, further comprising extension portions extending between the first attachment bracket and the first lateral member and between the second attachment bracket and the second lateral member.

24. For use with a communication rack having a first post and a second post each having a top and a bottom, a cable support comprising:
  a first attachment bracket attachable to the first post at a position between the top and the bottom of the post;
  a second attachment bracket attachable to the second post at a position between the top and the bottom of the post;
  a laterally extending member having a first end portion supported by the first attachment bracket and a second end portion supported by the second attachment bracket; and
  a plurality of bars extending from the lateral member, the plurality of bars projecting away from the communication rack when the first attachment bracket is attached to the first post and the second attachment bracket is attached to the second post.

25. For use with a communication rack having a first post and a second post each having a top and a bottom, a cable support shelf comprising:
  a first attachment bracket attachable to the first post between the top and the bottom of the post regardless of positioning of equipment attached within the communication rack;
  a second attachment bracket attachable to the second post between the top and the bottom of the post regardless of positioning of equipment attached within the communication rack;
  a first laterally extending member having a first end portion supported by the first attachment bracket and a second end portion supported by the second attachment bracket;
  a second laterally extending member, the first laterally extending member and the second laterally extending member being spaced from one another; and
  a plurality of tie members extending between the first and second laterally extending members, the plurality of tie members projecting away from the communication rack when the first attachment bracket is attached to the first post and the second attachment bracket is attached to the second post.

26. The cable support of claim 25 wherein the tie members extend perpendicular from the first and second laterally extending members.

27. The cable support of claim 25 wherein the first and second laterally extending members each include a left side portion and a right side portion with a center portion therebetween, and the tie members include a plurality of left side tie members extending at a laterally outward angle from the left side portion of the first laterally extending member to the left side portion of the second laterally extending member, and a plurality of right side tie members extending at a laterally outward angle from the right side portion of the first laterally extending member to the right side portion of the second laterally extending member, the left side cross bars and the right side cross bars being positioned closer to the center position of the first lateral member than the center portion of the second lateral member.

28. The cable support of claim 25 wherein the first laterally extending member has a longitudinal dimension and has a central portion along the longitudinal dimension, a first portion along the longitudinal dimension to a first lateral side of the central portion and a second portion along the longitudinal dimension to a second lateral side of the central portion opposite the first lateral side, and the second laterally extending member has a longitudinal dimension and has a central portion along the longitudinal dimension, a first portion along the longitudinal dimension to a first lateral side of the central portion and a second portion along the longitudinal dimension to a second lateral side of the central portion opposite the first lateral side, and wherein the cross members include at least one central cross member extending between the central portions of the first and second laterally extending members, a plurality of first cross members extending between the first portions of the first and second laterally extending members, and a plurality of second cross members extending between the second portions of the first and second laterally extending members.

29. The cable support of claim 25, further comprising extension portions extending between the first attachment bracket and the first laterally extending member and between the second attachment bracket and the second laterally extending member.

30. The cable support of claim 1 wherein the first attachment bracket, the second attachment bracket, the first lateral member, the second lateral member, and the plurality of cross bars are of a rigid plastic.

31. The cable support of claim 1 wherein the first attachment bracket, the second attachment bracket, the first lateral member, the second lateral member, and the plurality of cross bars are of a die cast aluminum.

32. The cable support of claim 1 wherein the first attachment bracket, the second attachment bracket, the first lateral member, the second lateral member, and the plurality of cross bars are of a die cast zinc.

33. The cable support of claim 1 wherein the first attachment bracket, the second attachment bracket, the first lateral member, the second lateral member, and the plurality of cross bars are of a rigid metal.

* * * * *